March 28, 1972  D. M. BOYD  3,652,450
FLUID DISTRIBUTION FOR FLUID-SOLIDS CONTACTING CHAMBERS
Original Filed Dec. 20, 1968
Figure 1
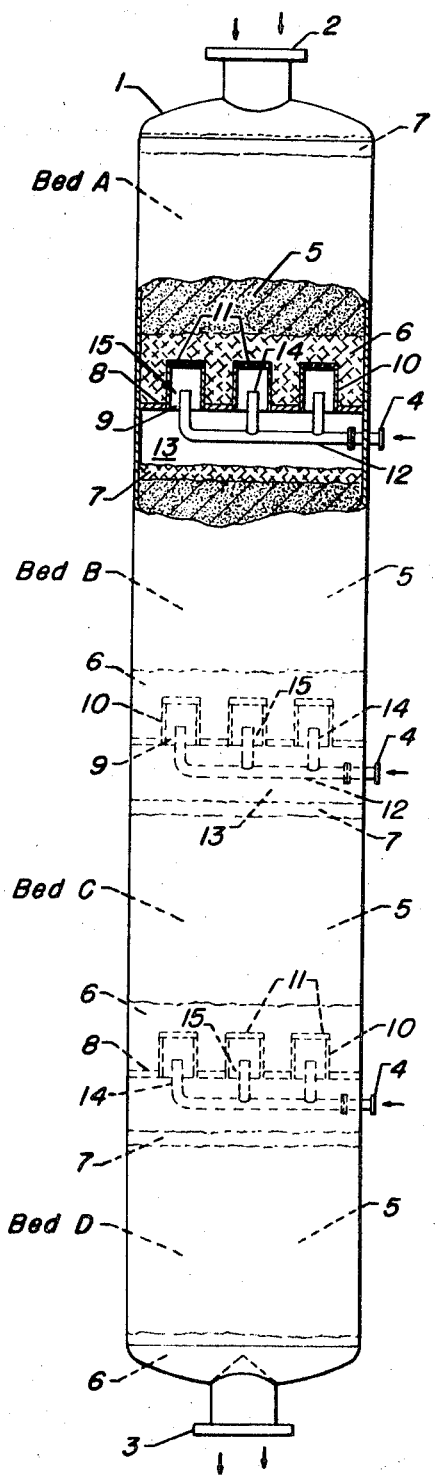
Figure 2a
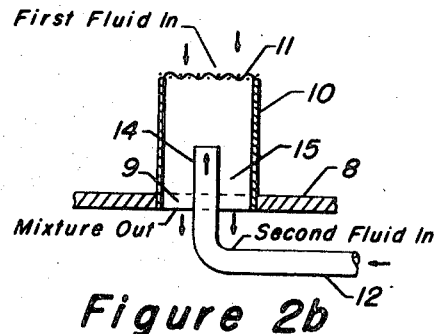
Figure 2b
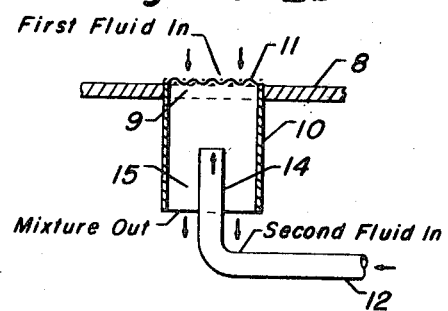
Figure 2c
Figure 3
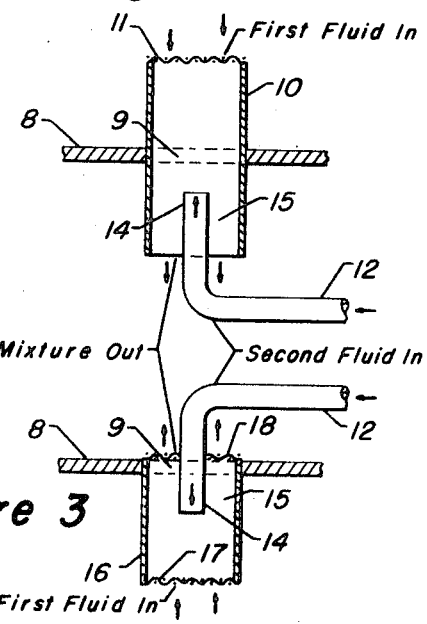

United States Patent Office 3,652,450
Patented Mar. 28, 1972

3,652,450
FLUID DISTRIBUTION FOR FLUID-SOLIDS
CONTACTING CHAMBERS
David M. Boyd, Clarendon Hills, Ill., assignor to
Universal Oil Products Company, Des Plaines, Ill.
Original application Dec. 20, 1968, Ser. No. 785,666, now
Patent No. 3,556,736, dated Jan. 19, 1971. Divided
and this application June 15, 1970, Ser. No. 46,237
Int. Cl. C10g 37/02
U.S. Cl. 208—146                    8 Claims

ABSTRACT OF THE DISCLOSURE

Method and apparatus for contacting two fluids in a fluid-solids contacting zone such as an adsorption zone or a reaction zone. A first fluid is passed downwardly into a distributor downcomer and a second fluid is passed upwardly into the downcomer via an inlet nozzle contained within the downcomer. A resulting mixture of first and second fluid passes downflow through the annulus confined between the downcomer wall and the inlet nozzle, and enters a bed of particulated solids below. The method and apparatus are also applicable to upflow processing through beds of particulated solids. Specific application is in hydrogenation, hydrotreating, hydrocracking, and hydrodealkylation reaction zones, wherein a hydrogen stream is utilized for the thermal quench of reactant hydrocarbon between catalyst beds.

CROSS-REFERENCE TO RELATED APPLICATION

This is a divisional application of copending application Ser. No. 785,666 filed on Dec. 20, 1968, now Pat. No. 3,556,736 said original application being restricted to the apparatus aspects of the present invention and this divisional application being directed to the method aspects thereof.

BACKGROUND OF THE INVENTION

The present invention relates to a method and apparatus for contacting two fluids in a fluid-solids contacting zone such as an adsorption zone or a reaction zone. More particularly, the invention is directed to the contacting of two fluids comprising a liquid phase and a vapor phase in a fluid-solids contacting zone, and to means and methods for effecting improved heat exchange between the vapor and liquid phases in the contacting vessel. More specifically, the invention relates to a new and improved method and apparatus for uniformly distributing mixed phases of vapor and liquid to a granular or particulated solids contacting zone, as in an adsorption tower or in a catalytic reactor such as a hydrogenation, hydrotreating, hydrocracking, or a hydrodealkylation reactor.

Among the most important of the various commercial processes are those involving the physical or chemical treatment of hydrocarbons and other organic materials with bodies of granular or particulated solid contact materials. Many of these processes involve the contacting of two fluids with the contacting material, and often the two fluids will comprise a liquid phase and a gas or vapor phase. It has been the experience in the art, that the introduction of such mixtures of liquid and vapor into a bed of particulated contact solids in a uniformly distributed manner, is difficult to achieve.

Typical of the art wherein uniform distribution of liquid and gas phases is necessary but infrequently achieved, is that of catalytic hydrotreating and catalytic hydrocracking of various hydrocarbon oils. It is well known that the feed to such a reaction zone comprises liquid hydrocarbon, vaporized hydrocarbon, and a hydrogen-rich gas, and that this feed is introduced into the reaction zone at an elevated temperature. It is further known that the reactions which are encountered in this catalytic environment are exothermic, and that the temperature of the vapor phase and of the liquid hydrocarbon phase is increased due to the exothermic heat of reaction. In order to avoid excessive temperature within the catalyst bed it is, therefore, typical to arrange the catalyst in a plurality of separate fixed beds so that diluent or quench vapors may be distributed between the beds during the reaction. The cool quench vapors, normally comprising hydrogen-rich gas, reduce the temperature of the effluent from the bed above before the liquid-vapor mixture of hydrocarbon and hydrogen is fed into the bed of catalyst below.

It is typical in the art to support each individual bed of catalyst upon a perforated support plate. It is also typical in the art to introduce the quench hydrogen between the fixed beds of catalyst by means of a perforated pipe grid or other means which is positioned throughout the cross-section of the reactor vessel at the quench point. The effluent from the catalyst bed above, thus rains down from the perforated support plate throughout the cross-sectional area of the reactor while the quench hydrogen is distributed by the perforated grid throughout the cross-sectional area of the reactor.

This prior art type of fluid distributing apparatus comprising a perforated catalyst support plate and a hydrogen quench grid distributor is utilized with the intent of achieving a complete distribution of liquid and gas phases as uniformly as possible throughout the cross-sectional area of the reactor vessel and of the catalyst bed below. It is also the purpose of this known fluid distributing apparatus to provide an intimate contact between hot effluent from the bed above and cool quench in order to achieve a uniform temperature of the constituents that pass into the bed below.

However, this typical prior art design has proven to be relatively ineffective in accomplishing these objectives. The problem is complicated by the fact that it is normal to add a relatively small amount of cool quench hydrogen to a large quantity of hot effluent hydrocarbon and hydrogen which is leaving the bed above at an elevated temperature. The problem is additionally complicated by the fact that the amount of cold quench material is relatively small in relation to the large cross-sectional area which must be covered in order to maintain a proper uniform distribution of liquid and vapor to the bed of catalyst below.

The problem is further complicated by the fact that there is a mixed-phase condition within the reactor itself. There is evidence that the heavier viscous liquids tend to channel down the side of the reactor whereas the less viscous liquids tend to channel in the central region of the catalyst bed with the vaporized hydrocarbon and hydrogen. The result is that the temperature encountered within the catalyst bed will be quite uneven and localized undesirable hot spots are often found in each bed. It is well known by those skilled in the art that the existence of the hot spots within the catalyst bed leads to indiscriminant or non-selective hydrocracking of the hydrocarbon constituents, which is an undesirable result.

Since the more viscous liquid tends to rain down through the support plate near the walls of the reactor, these viscous materials will also continue to channel along the walls in the beds below. This results in an ineffective quench between the beds, and the resulting continuation of liquid channeling produces further danger of localized hot spots in the lower catalyst beds.

SUMMARY OF THE INVENTION

It is, therefore, an object of the present invention to provide an improved method and apparatus for contacting two fluids in a fluid-solids contacting zone such as an adsorption zone or a reaction zone. It is another object of this invention to provide an improved method and apparatus for contacting and distributing mixed phases of vapor and liquid in such contacting zones. It is a further object of this invention to provide a fluid distribution means whereby greatly improved mixture of vapor and liquid phases occurs at their point of introduction into a solid contacting zone. It is a still further object of this invention to provide a means of improved heat exchange between a liquid phase and a vapor phase passing to a fluid-solids contacting zone where the vapor and liquid are at different temperatures, so that the liquid and vapor mixture enters the subsequent contacting zone at a substantially uniform temperature.

These and other objectives and the advantages of the present invention will become more readily apparent to those skilled in the art as the summary of the invention is more fully set forth hereinafter.

In the present invention, these objectives are achieved by use of a novel combination catalyst support and effluent redistribution apparatus wherein there is incorporated a novel means for injecting the quench hydrogen into the effluent which passes from the catalyst bed above to the catalyst bed below.

One embodiment of the invention is clearly set forth in FIG. 1 wherein there is illustrated a partially cut-away elevational view of a typical hydrocracking reactor vessel containing a plurality of catalyst beds supported upon the novel catalyst support and fluid distribution apparatus. There is also provided FIGS. 2a–2c wherein there are shown in vertical section, variations in construction of the inventive apparatus and wherein the method of operation providing the improved quench of reactor effluent for a downflow reactor vessel is illustrated. There is additionally provided FIG. 3 wherein there is illustrated in vertical section, a portion of the fluid distribution apparatus of the invention and its method of operation when applied to an upflow reaction or adsorption system.

In a preferred embodiment of the present invention as applied to downflow catalytic reaction zones, the fluid distribution and quench apparatus comprises an imperforate plate for support of the catalyst bed in contradistinction to the typical prior art catalyst support device which employs a perforated plate. However, there is spaced on the face of the imperforate catalyst support plate, a plurality of fluid openings through which effluent comprising liquid and vapor phases may flow from the catalyst bed above into the catalyst bed below. In conjunction with the fluid openings there is provided a cylindrical downcomer extending to an elevation above the imperforate support plate. This downcomer in turn is covered with a screen device for obstructing the passage of particulated solids while allowing the passage of fluid therethrough. Projecting into and terminating within the downcomer there is provided a nozzle for injecting the quench hydrogen.

In utilizing the inventive combination catalyst support and fluid distribution apparatus of the present invention in a downflow reaction zone, the effluent from the catalyst bed above is accumulated upon the imperforate support plate in contradistinction to the typical prior art catalyst support deck wherein the effluent rains down through the perforations. Since the deck is imperforated and there is provided a plurality of downcomers at an elevation above the surface of the catalyst support plate, the liquid portion of the mixed phase effluent accumulates thereon in a liquid reservoir. Thus, liquids channeling down from the catalyst bed above are retained for a time sufficient to allow some remixing of the liquids. The liquid then overflows the downcomers, and passes in admixture with the vapor phase from the catalyst bed above. The down- flowing mixed phase of liquid hydrocarbon, vaporized hydrocarbon, and hydrogen gas meets hydrogen quench which is injected from the nozzle contained in the downcomer upwardly and countercurrently to the effluent. In other words, the downflowing effluent meets upflowing quench hydrogen in a narrowly confined mixing and contacting zone within the downcomer. The downflowing effluent mixture, due to pressure drop considerations, sweeps the upflowing hydrogen downwardly, is intimately mixed with the injected quench hydrogen, and is thereby cooled. The mixed phase of hydrogen gas, hydrocarbon vapor, and hydrocarbon liquid then passes into the catalyst bed below at a substantially uniformly reduced temperature and in a substantially uniform distributed pattern.

In summary, therefore, one broad embodiment of the present invention may be characterized as a method for contacting two fluids in a fluid-solids contacting zone which comprises, passing first fluid into a first conduit means having disposed therein a second conduit means parallel to the axis of the first conduit means; passing second fluid into the second conduit means into a flow direction countercurrent to the direction of flow of the first fluid within the first conduit means; discharging second fluid from the second conduit means into the first conduit means countercurrent to the first fluid flow; passing first and second fluid into a space confined between the first and second conduit means in a flow direction countercurrent to the direction of flow of the second fluid confined within the second conduit means; and passing a mixture of first and second fluid from the annular space into a bed of particulated solids below.

As noted hereinabove, a particularly preferred embodiment of this method may be characterized as the method wherein the first fluid comprises a liquid and the second fluid comprises a vapor.

In addition, the present invention may be broadly characterized as a fluid distributing means which comprises an imperforate plate containing a plurality of openings spaced over the facial area of the plate; fluid conduit means extending from each of the openings to a distance from the plate; fluid inlet means projecting a finite distance into each of the conduit means and terminating therein; and, means for supplying fluid to each of the fluid inlet means.

Further, the present invention may be characterized as a fluid-solids contacting chamber containing a plurality of fixed beds of particulate solids which comprises, a vertically elongated confined chamber having at least one upper fluid port and one lower fluid port to provide for a generally vertical flow of fluid therethrough; a plurality of spaced horizontally positioned imperforate support plate members holding and retaining particulated contact solids in a plurality of separate superimposed packed beds; a plurality of fluid openings spaced over the horizontal area of each support plate member; a fluid conduit means extending from each of the openings to a distance from the associated support plate member; fluid inlet means projecting a finite distance into each of the conduit means and terminating therein; and, means for supplying fluid to each of the fluid inlet means.

A clear understanding of the present invention may now be obtained by referring to the accompanying figures.

DESCRIPTION OF FIGURE 1

As noted hereinabove, one particularly preferred embodiment wherein the present invention finds application is in exothermic hydrocarbon conversion processing. For illustrative purposes, the drawing of FIG. 1 shows one embodiment of the invention wherein a hydrocarbon fraction is hydrocracked in the presence of hydrogen over a suitable hydrocracking catalyst.

FIG. 1 shows a partially cut-away elevational view of a hydrocracking reactor vessel comprising a vertically elongated shell 1, having a fluid inlet nozzle 2 at the top of the shell and a fluid outlet nozzle 3 at the bottom of the shell. Reactor vessel 1 contains four catalyst beds, bed A through D, and below each of the upper three catalyst beds there is provided a hydrogen quench nozzle 4.

The catalyst beds contain a typical hydrocracking catalyst which may be present in pilled, spherical, or extruded form. The particulated catalyst particles 5 are supported upon a layer of an inert support material 6. The support material 6 may comprise ceramic balls, Berl Saddles, Raschig Rings, or any other inert packing material which is typically used within hydrocarbon conversion reactors for supporting beds of particulated catalyst. In addition, each bed contains a similar layer of inert support materials 7 at the top of the catalyst particles 5. This upper layer of inert support material is used as a means for holding down the particles of catalyst 5 in case of pressure fluctuations, and for enhancing distribution of fluids which enter at the top of each bed.

Each entire catalyst bed comprising catalyst particles 5, support layer 6, and covering layer 7, is supported upon an imperforate support plate 8 which contains a plurality of fluid openings 9 spaced over the face of the plate. Associated with each fluid opening 9 is a vertical downcomer conduit 10, which in the preferred embodiment has a cylindrical configuration. At the top of each downcomer conduit 10 there is provided a screen or other perforated means 11 containing perforations sufficient to provide that the particulated solids of the catalyst bed cannot penetrate, but that fluid flow may pass therethrough.

There is also provided a means for hydrogen quench below each of the upper three catalyst beds. The hydrogen quench enters the reactor vessel via inlet nozzle 4. From nozzle 4, the hydrogen quench passes into a quench header pipe 12 contained in space 13 confined between plate 8 and the layer 7 of inert material on the top of the catalyst bed below. Into each of the downcomer conduit means 10 there is a hydrogen inlet nozzle 14 which rises from header 12. The nozzle passes through the fluid opening 9 and directly into the confined space within downcomer 10.

In the typical hydrocracking process, a feed comprising liquid hydrocarbon, vaporized hydrocarbon, and a hydrogen-rich gas enters the reactor vessel 1 via inlet nozzle 2. This feed mixture passes through the first catalyst bed A and is increased in temperature due to the hydrocracking reaction which occurs therein. As the feed and resulting effluent pass through catalyst bed A, the vapor portion will typically tend to flow down the central region of the catalyst bed while the liquid portion will tend to channel down the reactor walls and along the outer periphery of the bed. The liquid portion of the effluent leaving catalyst bed A accumulates upon imperforated plate 8 for a time sufficient to provide that streams of liquid channeling down from bed A are intermixed. The accumulating liquids rise to a level equal to the height of the downcomer 10 and then overflow through perforated means 11 passing down the inside of the downcomer 10 with the vapor phase of the effluent comprising hydrocarbon and hydrogen.

As the hot effluent flows into the downcomer 10, it is contacted with upflowing hydrogen quench which is at a cooler temperature. The hydrogen quench is injected into the downcomer in an upflow manner via inlet nozzle 14. Due to the pressure drop of the system, the downflowing liquid and vapor from the bed A above will thoroughly mix with upflowing quench hydrogen from nozzle 14 within the confined space of downcomer 10. This provides for an improved quench of the hot effluent from the bed above, and the resulting mixture of effluent and quench achieves a substantially uniform temperature. The mixture then passes down the downcomer 10 through an annular space 15 confined between the downcomer wall and the nozzle 14. The mixture is discharged from the annular space via fluid opening 9 and into the void space 13. Thus the mixture of effluent liquid, effluent vapor, and quench hydrogen is passed into catalyst bed B below in a substantially uniformly distributed pattern at a substantially uniform temperature.

The effluent hydrocarbon from bed A reacts with the hydrogen on the catalyst of bed B, and exothermic heat of reaction is generated. The effluent leaving bed B thus is elevated in temperature and again is hydrogen quenched in the manner set forth hereinabove, utilizing the inventive fluid distribution and quench apparatus which supports catalyst bed B. The quenched effluent from bed B then passes with the corresponding hydrogen quench through bed C where further exothermic hydrocracking occurs. The resulting effluent is quenched with additional cool hydrogen in the inventive fluid distribution and quench apparatus which supports catalyst bed C. The resulting mixture then passes into catalyst bed D wherein further hydrocracking of hydrocarbon constituents occurs. The final effluent then leaves catalyst bed D and the reactor vessel 1 via the outlet nozzle 3 for separation processing in a manner that is well known by those skilled in the art.

DESCRIPTION OF FIGURES 2a THROUGH 2c

FIGS. 2a through 2c illustrate three more particular embodiments of the present invention and more clearly set forth the fluid distributor apparatus and method of operation which was illustrated in FIG. 1 above.

Referring now to FIG. 2a, there is shown in vertical section a portion of the imperforate support plate 8 having attached thereto a downcomer conduit means 10 which rises to an elevation above the support plate. On the top of the downcomer means which preferably is cylindrical, is a perforated means 11. Below the perforated means and inside the downcomer conduit means 10 is a fluid inlet nozzle 14 which projects through the fluid opening 9 of the imperforate support plate 8 and terminates within the downcomer.

The liquid phase of the first fluid mixture which, for example, comprises the effluent from a hydrocracking catalyst bed, overflows from the reservoir of liquid contained upon the support plate 8 and pours through the perforated means 11. In addition, the hydrogen gas and hydrocarbon vapors of the hydrocracking effluent flow downward through the perforated means 11 as part of the first fluid mixture. The second fluid, comprising quench hydrogen in this example, enters the fluid inlet nozzle 14 and passes upflow into the downcomer 10. The downflowing effluent comprising hydrocarbon liquid, hydrocarbon vapor, and hydrogen gas at elevated temperature, mixes with the upflowing cool hydrogen in a turbulent manner within downcomer 10 so that improved heat transfer occurs thereby. The resulting quenched mixture of hydrocarbon liquid, hydrocarbon vapor, and hydrogen gas then passes out through the fluid opening 9 via the open-ended annular space 15 which is confined between the inner wall of downcomer conduit means 10 and the fluid inlet nozzle 14. The mixture flows out of the opening 9 of the imperforate support plate 8 and drops into the catalyst bed, not shown, which is positioned below at a substantially uniform temperature which is intermediate to the temperature of the first fluid (hydrocracking effluent) and the temperature of the second fluid (quench hydrogen).

FIG. 2a illustrates an embodiment of the present invention wherein the downcomer 10 of the distributor deck apparatus rises to a finite distance above the imperforated support plate. However, it is readily apparent to those skilled in the art that the downcomer need not rise to an elevation above the plate.

FIG. 2b illustrates an embodiment wherein the downcomer means 10 is projected below the surface of the imperforated support plate 8. In such embodiment it is apparent that the perforate means 11 will be above the imperforate support plate 8 or at least level with it at the top of the downcomer 10. There is also shown in FIG. 2b, the fact that the fluid inlet nozzle 14 for the second fluid rises into the downcomer 10 and terminates therein, but that it does not otherwise pass through the fluid opening 9 of the imperforate support plate 8. The embodiment shown in FIG. 2b is not preferred, however, since no reservoir of liquid phase is retained upon support plate 8 for a sufficient time to thoroughly mix streams of liquid channeling down from above, although some mixing will occur.

FIG. 2c illustrates one further modification of the basic elements which are embodied within the distributor deck apparatus of the present invention. In drawing 2c, it may be seen that the downcomer means 10 projects above the imperforated support plate 8 and that it also projects below the imperforated support plate. The perforated means 11 is appended at the top of the downcomer and the fluid inlet nozzle 14 for the second fluid (hydrogen quench) passes up into the downcomer and terminates therein without passing through the opening of the imperforated support plate.

These FIGS. 2a through 2c illustrate only a few of the modifications to the basic elements of the inventive distributor deck apparatus as applied to a downflow contacting chamber and are not intended to so limit the invention. Other modifications of the apparatus will be readily ascertainable by those skilled in the art. For example, in the embodiment shown in FIG. 2c, fluid inlet nozzle 14 could project up into downcomer conduit 10 and terminate therein within the locus of fluid opening 9 in plate 8, or at a locus above plate 8. While downcomer conduit means 10 preferably has a cylindrical form, it could have any noncircular cross-section and it could contain more than one fluid inlet means 14. Of course, the annular space 15 would not then have the cross-sectional configuration of a single ring annulus, but would be similar to fused rings. Those skilled in the art will also realize that perforate means 11 could be any device such as a slotted plate, a woven screen, or a cap device such as a typical bubble cap which could be provided with slots or other perforations.

FIG. 3

As noted hereinabove, all of the drawings and the illustrations heretofore given are shown for a downflowing system. However, the fluid distributing method and the inventive distributor apparatus of the present invention are equally applicable to any fluid contacting process whereby fluids are passed upflow through particulated solid beds. Thus, in FIG. 3 there is shown the imperforated support plate 8 with an upcomer conduit means 16 which projects downward below the plate 8. On the bottom and on the top of the downcomer means 16 there is provided a lower perforated means 17 and an upper perforated means 18 which permit the flow of fluids therethrough but which obstruct the passage of particulated contact solids. Within the upcomer apparatus there is provided the fluid inlet nozzle 14 which passes through upper perforated means 18. The first fluid rising up from the bed below, not shown, passes up through the lower perforated means 17 and into upcomer means 16 wherein it contacts downflowing second fluid which is injected into the system via the fluid inlet nozzle 14. The upflowing first fluid from the first bed below contacts the downflowing second fluid from the fluid inlet nozzle 14 and turbulent mixing of the fluids occurs. The resulting mixture then passes upflow through the annular space 15 which is confined between the walls of the upcomer 16 and the fluid inlet nozzle 14. The mixture then passes out through the upper perforated means 18 and into the bed above, not shown.

Again, it must be pointed out that the illustration of FIG. 3 is only one embodiment of the present invention for an upflow fluid-solids contacting zone. The upcomer conduit 16 is shown to project to a distance below the imperforated support plate 8 in this FIG. 3, but it could project above or it could project both above and below the imperforated support plate. These and other modifications to the basic elements comprising the inventive fluid distribution apparatus are readily ascertainable to those skilled in the art.

PREFERRED EMBODIMENTS

The method of operation of the inventive fluid distributing means is readily ascertainable to those skilled in the art from the teachings that have been presented hereinabove, and the advantages to be accrued from the inventive device and method are equally apparent.

It must be realized, however, that the effectiveness of the device, as well as the contacting method, will depend upon the specific environment in which it is utilized, and in the specific dimensional design of the deck as it is specifically employed.

The dimensions for the inventive distributor deck and its elements cannot be set forth herein with great specificity since a great many factors will affect the dimensions which are required in any specific environment. Among the factors to consider in a hydrocracking reactor, for example, are the rate of flow of the effluent from the catalyst bed above to the bed below, and the rate of flow of the quench hydrogen. The vapor-liquid distribution of the effluent flowing from the bed above will also affect the dimensions which are required in the design of the inventive distributor deck, and the temperature and pressure of the effluent will have a pronounced effect upon this vapor-liquid distribution. In addition, it must be realized that the temperature at which the quench hydrogen is introduced via nozzle 14 will also have a pronounced effect on the degree of quench which is experienced. Finally, molecular weights must be considered, and the density of the various liquids and vapor phases is of primary consideration.

However, for purposes of illustration it may be set forth that the typical downcomer 10 will preferably extend at least two inches above the imperforate support plate 8 and fluid opening 9 and that in many applications the downcomer height will be more than two inches. Normally, downcomer 10 will have a circular cross-section with a preferred diameter of about four inches but in specific applications downcomer 10 and fluid opening 9 may have diameters from one inch to eight inches or more in range. The distance which nozzle 14 projects into downcomer 10 will depend to some extent upon the diameter of downcomer 10 and fluid opening 9 as well as the other considerations noted in the paragraph above, such as temperatures and flow rates. Thus, the distance which nozzle 14 projects into a downcomer 10 could be varied in the range of from a fraction of the total downcomer height to virtually the entire downcomer height.

It will be apparent to those skilled in the art that the number of fluid openings which are provided in imperforate support plate 8 will vary with the specific application. However, there should be a sufficient number of fluid openings substantially uniformly distributed on support plate 8 so that the cross-sectional area of the top of the catalyst bed below is thoroughly contacted with the mixture of effluent hydrocarbon and quench hydrogen in a substantially uniform manner. Thus, the number of fluid openings 9 in support plate 8 could range from four to one hundred or even more. Primarily, the pressure drop across the fluid distribution deck of the present invention must be considered in establishing the number of fluid openings. Since it is normal to seek a low pressure drop, at least six openings per deck should be provided in any typical hydrocracking operation.

It will also be apparent to those skilled in the art that the spacing of the fluid openings 9 and associated downcomers 10 over the facial area of imperforate support plate 8 will vary with the specific application and with the number of fluid openings incorporated in the inventive fluid distribution deck. Thus, in a very small fluid-solids contacting chamber wherein only a single downcomer and associated quench nozzle is necessary, the fluid opening will be positioned in the center of the circular plate. Where four openings are required, they will typically be spaced equidistant away from the center on radii at 90° from each other, in order to fully distribute the mixture of effluent and quench in a substantially uniform manner over the circular cross-section of the particulated solids bed below. Where seven openings are required, they may be positioned with one opening in the center of the circular support plate, and the other six openings spaced away equidistant from the center on radii at 60° from each other. Where a great many fluid openings are required in a large chamber, for example ten or more, the fluid openings may be spaced over the face of the imperforate support plate in concentric circles, in a square pitch distribution, in a triangular pitch distribution, or in any other pattern sufficient to provide a substantially uniform distribution of the fluid mixture over the cross-section of the bed below.

While the foregoing discussion relative to dimensional design of the inventive fluid distribution apparatus has been directed toward downflow embodiments, the factors which have been recited hereinabove as being necessary design considerations are of equal importance in an upflow application of the apparatus as illustrated in FIG. 3. Those skilled in the art can readily design the inventive apparatus for either upflow or downflow application by utilizing the teachings hereinabove.

It will be noted that in the discussion above, the specific example comprises an illustration wherein a hydrocarbon was catalytically hydrocracked. It is well known to those skilled in the art that the catalyst will deteriorate as the operation proceeds so that catalyst activity and selectivity gradually becomes lower during the life of the catalyst. This then requires that the inlet temperature of the fluid entering via inlet port 2 be gradually increased over the life of the catalyst. This increase of temperature will cause a change in the vapor-liquid equilibrium of the effluent which is discharged from any given catalyst bed, thus causing a change in the hydraulics of the fluid distributing deck. In order to compensate for this change so that the effectiveness of mixing and quenching for the inventive fluid distribution apparatus is not lost, those skilled in the art will perceive that the temperature of the quench hydrogen can be changed, or that the rate of the quench hydrogen can be changed sufficiently so that the hydraulic balance necessary for the most effective operation of the inventive distributor deck will remain in substantial equilibrium throughout the life of the catalyst.

While the embodiments disclosed hereinabove have been directed to the exothermic catalytic reaction of hydrocarbons in a hydrogen atomsphere, the invention is not so limited. Those skilled in the art will perceive that the method of contacting two fluids in a fluid-solids contacting zone and the apparatus therefor have equal application in any fluid-solids contacting zone such as in adsorption zones as well as reaction zones. Additionally, the apparatus is not limited to the support of fixed beds of particulated contact solids, but it can also find application, for example, as the feed distribution apparatus at the top of the first bed contained within a downflow contacting chamber. The method and apparatus also is not limited to the specific fluids discussed hereinabove. Thus, the first fluid discussed illustratively hereinabove need not be a mixture of liquid and vapor phases, but it also could be solely a liquid phase, or solely a vapor phase. And the second fluid discussed hereinabove need not be limited to a gas or vapor phase, but it also could be solely a liquid phase, or a mixture of liquid phase and gas phase. Furthermore, the second fluid discharged from nozzle 14 need not be at a temperature below the temperature of the first fluid, but it may be at the same temperature as the first fluid, or it may be at a temperature above the first fluid temperature in order to provide a heat input into the fluid-solid contacting zone. Additionally, while the downflow embodiments of the inventive apparatus and fluid contacting method have preferred application to fixed beds of particulated solids, the upflow embodiments may be easily adapted to fixed beds, fluidized beds, or ebullient beds. Similarly, the method aspects of the present invention are not limited to upflow or downflow contacting of the first and second fluid, but the first and second fluids could be contacted in countercurrent horizontal flow, with the resulting fluid mixture passing horizontally through annular space 15 before passing into a bed of contact solids which may be disposed within a contacting chamber for upflow, downflow, or horizontal contacting of the fluid mixture with the bed of solids.

These and other modifications to the method and apparatus aspects of the present invention will now be readily apparent to those skilled in the art, and such alternate embodiments should not be construed in any manner to detract from the broad scope of the present invention.

However, from the disclosure hereinabove, it will be readily apparent that the particularly preferred embodiment of the present invention comprises application of the inventive apparatus and contacting method wherein the fluid-solids contacting chamber is a downflow exothermic catalytic reaction zone for the processing of hydrocarbon constituents in the presence of hydrogen. Additionally, as noted hereinabove, specific application of the present invention is in downflow hydrogenation, hydrotreating, hydrocracking, and hydrodealkylation reaction zones wherein a hydrogen stream is utilized for the thermal quench of reactant hydrocarbon between catalyst beds.

It will be apparent to those skilled in the art that in such preferred applications, the pressure wherein the inventive apparatus and contacting method are functional will be in the range of from 100 p.s.i.g. to 3000 p.s.i.g. For example, in the hydrogenation of benzene to produce cyclohexane, a pressure range of from 100 p.s.i.g. to 500 p.s.i.g. is normally utilized. In the hydrotreating of light hydrocarbon fractions such as gasoline or naphtha to saturate olefins and to remove sulfur, nitrogen, oxygen, metallic, and other impurities, a pressure in the range of from 100 p.s.i.g. to 1000 p.s.i.g. is typically utilized. In the hydrotreating or hydrocracking of hydrocarbon fractions heavier than naphtha such as kerosines, gas oils, cycle oils, reduced crudes, etc., pressures in the range of from 100 p.s.i.g. to 3000 p.s.i.g. may be utilized. In the hydrodealkylation of alkylbenzenes to produce benzene, a pressure in the range of from 300 p.s.i.g. to 1000 p.s.i.g. is normally employed.

In addition, those skilled in the art will realize that for these processes the inventive apparatus and contacting method will be utilized at a temperature in the range of from 300° F. to 1500° F. For example, in the hydrogenation of benzene to produce cyclohexane, a temperature range of from 300° F. to 600° F. is normal. In the hydrotreating of light hydrocarbons such as gasoline or naphtha fractions, a temperature range of from 500° F. to 900° F. is typically utilized. In the hydrotreating or hydrocracking of hydrocarbon fractions heavier than naphtha, a temperature range of from 500° F. to 1000° F. may be employed. In the hydrodealkylation of alkylbenzenes to produce benzene, temperatures in the range of from 1000 to 1500° F. may be utilized.

In these hydrocarbon processes wherein the inventive apparatus and contacting method find particular utility, the beds of particulated contact solids will normally comprise catalyst containing one or more metallic components selected from the Group VI-B and Group VIII of the Periodic Table (Periodic Table, Handbook of Chemistry and Physics, 43rd edition). These metallic components are typically supported on a refractory inorganic oxide having a pilled, spherical, or extruded form although any granular or particulated form may be employed. Typical support materials of this type are alumina, silica, magnesia, zirconia, kieselguhr, diatomaceous earth, etc., either singly or in combination. A typical hydrogenation catalyst comprises a Group VIII metal on the refractory inorganic oxide, and a preferred catalyst for hydrogenation of aromatic hydrocarbons comprises nickel on kieselguhr. A typical hydrotreating catalyst will contain silica and alumina and a Group VIII metal or a Group VI–B metal or a combination of metals thereof. One preferred hydrotreating catalyst comprises silica, alumina, nickel, molybdenum, and cobalt. A typical hydrocracking catalyst will contain at least one metallic component selected from the metals of Group VI–B and Group VIII such as platinum, palladium, nickel, or molybdenum and a composite of silica-alumina. A typical catalyst for the hydrodealkylation of alkyl aromatics will comprise a Group VI–B metal such as chromium, molybdenum, or tungsten on the refractory inorganic oxide support material and one particularly preferred catalyst comprises chromium oxide on silica-alumina.

In summary, therefore, a preferred embodiment of the present invention may be characterized as a method for contacting two fluids in a fluid-solids contacting zone which comprises passing first fluid at a first temperature into a first conduit means having disposed therein second conduit means parallel to the axis of the first conduit means; passing second fluid at a second temperature into the second conduit means in a flow direction countercurrent to the direction of flow of the first fluid within the first conduit means; discharging second fluid from the second conduit means into the first conduit means countercurrent to the first fluid flow; passing first and second fluid into a space confined between the first and second conduit means in a flow direction countercurrent to the direction of flow of the second fluid confined within the second conduit means, whereby a mixture of first and second fluids is produced at a third temperature intermediate to the first and second temperatures; and passing the mixture from the space into a bed of particulated solids.

Furthermore, it will be readily apparent that a particularly preferred embodiment of the present invention may be characterized as the method disclosed in the paragraph immediately above wherein the contacting zone comprises a catalytic reaction zone, the first fluid comprises hydrocarbon, the second fluid comprises hydrogen, and the bed of particulated solids comprises one of the group consisting of a hydrogenation catalyst, a hydrotreating catalyst, a hydrocracking catalyst, and a hydrodealkylation catalyst.

The invention claimed:

1. A method for contacting a first solid bed of particulates with hydrocarbon fluid which separates into a gas and a liquid comprising:
   (a) passing a first mixed fluid phase comprising said gas and liquid formed as below into a first conduit means having disposed therein second conduit means parallel to the axis of first said conduit means;
   (b) passing a second fluid comprising hydrogen through said second conduit means in a flow direction substantially counter-current to the direction of flow of said first fluid phase within said first conduit means;
   (c) collecting said hydrocarbon liquid in a collection zone adjacent to and below the inlet of said first conduit and discharging it by overflow into said first conduit wherein it mixes with said hydrocarbon gas to form said first mixed fluid phase;
   (d) discharging first fluid phase mixed with said hydrogen from said second conduit into a second bed of solids; and
   (e) repeating said steps (a), (b) and (c) with respect to said second bed.

2. Method of claim 1 wherein said first fluid phase comprises mixed vapors, and said second fluid comprises a liquid.

3. Method of claim 1 wherein said first mixed fluid phase is passed downwardly within said first conduit means, said second fluid is passed upwardly within said second conduit means, and said mixture of first fluid phase and second fluid is passed downwardly within said space.

4. Method of claim 1 wherein said first fluid is passed horizontally within said first conduit means, said second fluid is passed horizontally within said second conduit means, and said mixture of first and second fluid is passed horizontally within said space.

5. Method of claim 1 wherein said first fluid phase is at a first temperature, said second fluid is at a second temperature, and said mixture is produced at a temperature intermediate to said first and second temperatures.

6. Method of claim 5 wherein said first temperature is below said second temperature.

7. Method of claim 6 wherein said first temperature is above said second temperature.

8. Method of claim 6 wherein said contacting zone comprises a catalytic reaction zone, said first fluid phase comprises mixed hydrocarbons, said second fluid comprises hydrogen, and said bed of particulated solids comprises one of the group consisting of a hydrogenation catalyst, a hydrotreating catalyst, a hydrocracking catalyst and a hydrodealkylation catalyst.

References Cited
UNITED STATES PATENTS

| | | | |
|---|---|---|---|
| 1,940,649 | 12/1933 | Russell | 208—146 |
| 2,475,822 | 7/1949 | Cummings | 208—146 |
| 2,662,846 | 12/1953 | Montgomery et al. | 208—146 |
| 2,904,502 | 9/1959 | Shopleigh | 208—146 |
| 2,943,998 | 7/1960 | Decker | 208—65 |
| 3,144,404 | 8/1964 | Tyson | 208—143 |
| 3,186,935 | 7/1965 | Vaell | 208—57 |
| 2,863,931 | 12/1958 | Summers | 23—288 |
| 3,075,752 | 1/1963 | Leva | 261—113 |
| 3,425,810 | 2/1969 | Scott | 261—113 |

HERBERT LEVINE, Primary Examiner

U.S. Cl. X.R.

208—59, 143; 23—288